US008494728B2

(12) United States Patent
Unno

(10) Patent No.: US 8,494,728 B2
(45) Date of Patent: Jul. 23, 2013

(54) CONTINUOUSLY VARIABLE TRANSMISSION CONTROL DEVICE, CONTINUOUSLY VARIABLE TRANSMISSION, AND VEHICLE EQUIPPED WITH THE SAME

(75) Inventor: Toshio Unno, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1110 days.

(21) Appl. No.: 12/202,696

(22) Filed: Sep. 2, 2008

(65) Prior Publication Data

US 2009/0062995 A1 Mar. 5, 2009

(30) Foreign Application Priority Data

Sep. 3, 2007 (JP) ................................ 2007-227787
Nov. 27, 2007 (JP) ................................ 2007-305326

(51) Int. Cl.
| | | |
|---|---|---|
| G06F 7/00 | (2006.01) | |
| F16H 9/18 | (2006.01) | |
| F16H 55/54 | (2006.01) | |
| F16H 55/56 | (2006.01) | |
| F16H 9/10 | (2006.01) | |
| F16H 61/662 | (2006.01) | |
| F16H 61/26 | (2006.01) | |
| B62D 31/02 | (2006.01) | |
| B62D 61/02 | (2006.01) | |
| B60K 17/06 | (2006.01) | |
| B60W 10/00 | (2006.01) | |

(52) U.S. Cl.
USPC .................. 701/51; 701/60; 474/29; 474/43; 474/53; 474/70; 180/219; 180/230; 180/231; 180/366; 477/39; 477/43; 477/44; 477/46; 477/135

(58) Field of Classification Search
USPC ............ 701/51, 60; 474/8, 11–19, 23, 26–30, 474/37, 43–50, 53, 69, 70, 101, 133, 135, 474/144, 211, 242; 180/219, 230, 231, 366; 477/39, 43–48, 135
See application file for complete search history.

(56) References Cited

U.S. PATENT DOCUMENTS 5,052,990 A * 10/1991 Sakakibara et al. .......... 475/210
5,057,061 A * 10/1991 Sakakibara et al. .......... 475/210
(Continued)

FOREIGN PATENT DOCUMENTS

| EP | 1 400 728 A3 | 3/2004 |
| EP | 1 612 456 A2 | 1/2006 |
| JP | 06-249328 | 9/1994 |

OTHER PUBLICATIONS

European Search Report dated Dec. 3, 2008.

*Primary Examiner* — James Trammell
*Assistant Examiner* — Majdi Alsomiri
(74) *Attorney, Agent, or Firm* — Keating & Bennett, LLP

(57) ABSTRACT

A transmission 20 includes an input shaft 12, an output shaft 13, a primary sheave 23 that rotates together with the input shaft 12, a secondary sheave 24 that rotates together with the output shaft 13, and a belt 25 wound around both the primary sheave 23 and the secondary sheave 24. The transmission 20 includes a motor 22 that shifts a transmission ratio by driving a movable sheave 23a of the primary sheave 23. A control device (ECU 5) of the transmission 20 includes a secondary sheave rotation speed sensor 28 that detects rotation of the belt 25, and a control portion 55 of the ECU 5 performs a sheave position control (normal control of the transmission ratio) after rotation of the belt 25 is detected after starting.

16 Claims, 11 Drawing Sheets

U.S. PATENT DOCUMENTS

| | | | |
|---|---|---|---|
| 6,181,239 B1* | 1/2001 | Ahmed | 340/438 |
| 2005/0037876 A1* | 2/2005 | Unno et al. | 474/12 |
| 2006/0003866 A1* | 1/2006 | Unno et al. | 477/44 |
| 2007/0054764 A1* | 3/2007 | Mochizuki et al. | 474/18 |
| 2007/0054765 A1* | 3/2007 | Mochizuki et al. | 474/18 |
| 2007/0093324 A1* | 4/2007 | Pritchett | 474/23 |
| 2007/0202975 A1* | 8/2007 | Ishida et al. | 474/8 |
| 2008/0255737 A1* | 10/2008 | Fujiwara et al. | 701/51 |

* cited by examiner

CONTINUOUSLY VARIABLE TRANSMISSION CONTROL DEVICE, CONTINUOUSLY VARIABLE TRANSMISSION, AND VEHICLE EQUIPPED WITH THE SAME

This application claims priority under 35 U.S.C. §119 to Japanese Patent Applications No. 2007-227787 filed on Sep. 3, 2007 and No. 2007-305326 filed on Nov. 27, 2007, the entire disclosures of which are incorporated herein by reference in their entireties.

BACKGROUND OF THE INVENTION

1. Field of the Invention

The preferred embodiments of the present invention relate, inter alia, to a continuously variable transmission control device, a continuously variable transmission, and a vehicle equipped with the same.

2. Description of the Related Art

The following description sets forth the inventor's knowledge of related art and problems therein and should not be construed as an admission of knowledge in the prior art.

In known art, an electronically controlled continuously variable transmission (hereinafter referred to as "ECVT") capable of continuously varying the transmission gear change ratio or the transmission ratio (hereinafter referred to as "transmission ratio") is used in vehicles, such as, e.g., scooter type motorcycles, or so-called four wheel buggies.

Normally, an ECVT includes a primary sheave that rotates together with an input shaft, a secondary sheave that rotates together with an output shaft, a belt wound around both the primary sheave and the secondary sheave, and an actuator for varying the belt groove width of the primary sheave. Furthermore, the above-mentioned vehicle includes a control device for controlling the ECVT actuator. The control device controls the actuator and changes the transmission ratio based on a driving state of the vehicle, such as, e.g., a vehicle speed, an engine speed, or a throttle opening degree, and also based on a transmission ratio map which shows the relationship with the transmission ratio. Accordingly, in vehicles equipped with an ECVT (hereinafter referred to as "ECVT-equipped vehicle"), it is not necessary for a rider to perform the gear shift operation and/or the clutch operation.

Specifically, the primary sheave normally has a movable sheave provided on the input shaft in an axially slidable manner and a fixed sheave fixed on the input shaft in an axially immovable manner. The actuator is connected to the movable sheave of the primary sheave. The movable sheave of the primary sheave is driven by the actuator and slides in the axial direction of the input shaft. This varies the width of the belt groove of the primary sheave.

Furthermore, the secondary sheave has a movable sheave provided on the output shaft in an axially slidable manner and a fixed sheave fixed on the output shaft in an axially immovable manner. A spring for urging the movable sheave toward the fixed sheave side is connected to the movable sheave of the secondary sheave. The movable sheave of the secondary sheave is constantly urged toward the fixed sheave side by the spring. For this reason, a load in the direction that narrows the width of the belt groove (in the direction that widens a winding radius of the belt) is constantly applied to the secondary sheave. Thus, the primary sheave constantly receives a load in the direction that widens the belt groove width (in the direction that narrows the winding radius of the belt) from the secondary sheave side.

With this kind of structure, when the movable sheave of the primary sheave slides toward the fixed sheave, the belt groove width of the primary sheave is narrowed, and the winding radius of the belt is enlarged. Accompanying this action, the belt in the secondary sheave belt groove is moved radially inward toward the secondary sheave, and the movable sheave of the secondary sheave moves in the direction away from the fixed sheave against the urging force of the spring. In this way, the transmission ratio becomes smaller, and the movable sheave moves closer to the so-called Top position at which the transmission ratio is at a minimum.

On the other hand, when the movable sheave of the primary sheave slides in the direction away from the fixed sheave, the belt groove width of the primary sheave widens, resulting in a reduced winding radius of the belt. Accompanying this action, the belt in the secondary sheave belt groove is moved radially outward toward the secondary sheave, and the movable sheave of the secondary sheave moves toward the fixed sheave by the urging force of the spring. In this way, the transmission ratio becomes larger, and the movable sheave moves closer to the so-called Low position at which the transmission ratio is at a maximum.

Meanwhile, normally the control device controls the actuator such that the movable sheave of the primary sheave returns to the Low position at which the belt groove width is at its widest and the transmission ratio is at the maximum when the vehicle is stopped (including idling). Moreover, the control device controls the actuator so that the movable sheave of the primary sheave returns to the Low position when the power is turned on.

However, for example, when the power is turned off just after driving is stopped through sudden braking, the actuator sometimes stops without having fully returned the primary sheave to the Low position. Moreover, if the power is turned on again in this state, only the movable sheave of the primary sheave will move by itself to the low position in a state in which the belt is not rotating. In other words, despite the belt not rotating, the belt groove width on the primary sheave side widens. Thus, the belt may come off from the primary sheave.

However, if the belt comes off from the primary sheave, the primary sheave will idly rotate without the belt such that no force will be transmitted to the belt. Furthermore, if a sheave position control for sliding the movable sheave of the primary sheave in order to vary the transmission ratio starts in this state, the belt to which force is not being transmitted due to the belt having come off from the primary sheave will be sandwiched by the primary sheave whose rotation speed has been increased to some degree. This will cause sudden transmission of the force to the belt. This action causes unsmooth acceleration, resulting in poor riding comfort.

Therefore, it has been proposed that, when the groove width of the primary sheave at the time of starting the engine is narrower than a stipulated groove width set in advance, a transmission ratio control (in other words, sheave position control) is not performed up to the point when the engine speed has exceeded a stipulated speed change permissible speed and the transmission ratio control is initiated after the engine speed has exceeded the speed change permissible speed (see, for example, Japanese Patent No. 3375362 (hereinafter referred to as "Patent Document 1")

With the ECVT control device described in Patent Document 1, it is presumed that the belt will rotate together with the primary sheave when the engine speed exceeds the speed change permissible speed. In reality, however, it cannot be determined certainly whether the primary sheave is idly rotating with the belt. In other words, if the primary sheave is rotating together with the belt, it can be determined with certainty from the engine speed that the belt is rotating. However, if the primary sheave is idly rotating without the belt, rotation of the belt cannot be confirmed by the engine speed. For this reason, with the above-described control device, even if the primary sheave is idly rotating without the belt, the sheave position control may inadvertently start because the engine speed has exceeded the speed change permissible speed. Accordingly, with the ECVT control device described in Patent Document 1, whether the primary sheave is rotating together with the belt cannot be detected with certainty. As a result, it may be difficult to solve the issue of being unable to achieve smooth acceleration when the primary sheave is idly rotating without the belt.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a continuously variable transmission which controls a transmission ratio using an actuator, the control device being capable of suppressing deterioration of driving comfort due to idle rotation of a primary sheave not with a belt at the time of starting.

Among other potential advantages, some embodiments can provide a continuously variable transmission control device which controls a transmission ratio using an actuator, the control device being capable of suppressing deterioration of driving comfort due to idle rotation of a primary sheave not with a belt at the time of starting.

Among other potential advantages, some embodiments can provide a vehicle equipped with the aforementioned continuously variable transmission or continuously variable transmission control device.

According to a first aspect of a preferred embodiment of the present invention, a control device for an electronically-controlled continuously variable transmission is positioned between a drive source and a driving wheel of a vehicle and capable of continuously varying a transmission ratio. The transmission includes an input shaft and an output shaft. The transmission also includes a primary sheave that includes a primary fixed sheave body capable of rotating together with the input shaft and a primary movable sheave body capable of rotating together with the input shaft and facing the primary fixed sheave body in an axially movable manner with respect to the input shaft. The primary movable sheave body and the primary fixed sheave body form a primary-side belt groove that extends and widens toward a radially outward direction thereof. The transmission also includes a secondary sheave that includes a secondary fixed sheave body capable of rotating together with the output shaft and a secondary movable sheave body capable of rotating together with the output shaft and facing the secondary fixed sheave body in an axially movable manner with respect to the output shaft. The secondary movable sheave body and the secondary fixed sheave body form a secondary-side belt groove that extends and widens toward a radially outward direction thereof. The transmission also includes a belt wound in the primary-side belt groove and the secondary-side belt groove. The transmission also includes an actuator that varies a transmission ratio between the primary sheave and the secondary sheave by varying at least one of a width of the primary-side belt groove and a width of the secondary-side belt groove. The transmission also includes a belt rotation detection sensor that detects rotation of the belt directly or indirectly. The transmission also includes a control portion that controls the actuator. The control portion starts control of the actuator after rotation of the belt is detected after starting.

According to the above-described control device, after starting, control of the actuator for varying the transmission ratio starts after rotation of the belt is detected. Thus, while the primary sheave is rotating idly without the belt, actuator control is not performed. Thus, it is possible to inhibit clash from occurring during acceleration due to starting of the actuator control for varying the transmission ratio when the primary sheave is rotating idly.

According to the aforementioned preferred embodiment of the present invention, a continuously variable transmission that uses an actuator to control the transmission ratio can prevent deterioration of driving comfort due to idle rotation of a primary sheave not with a belt during acceleration.

According to a second aspect of a preferred embodiment of the present invention, a vehicle comprises the control device for the electronically-controlled continuously variable transmission as recited above.

According to a third aspect of a preferred embodiment of the present invention, a vehicle comprises the electronically-controlled continuously variable transmission as recited above.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 10A and 10B show a belt rotation detection sensor of a fourth modification, wherein FIG. 10A is a top view of a belt and FIG. 10B is a side view of the belt and sensor.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

First Embodiment

<Structure of Motorcycle 1>

Figure 1:
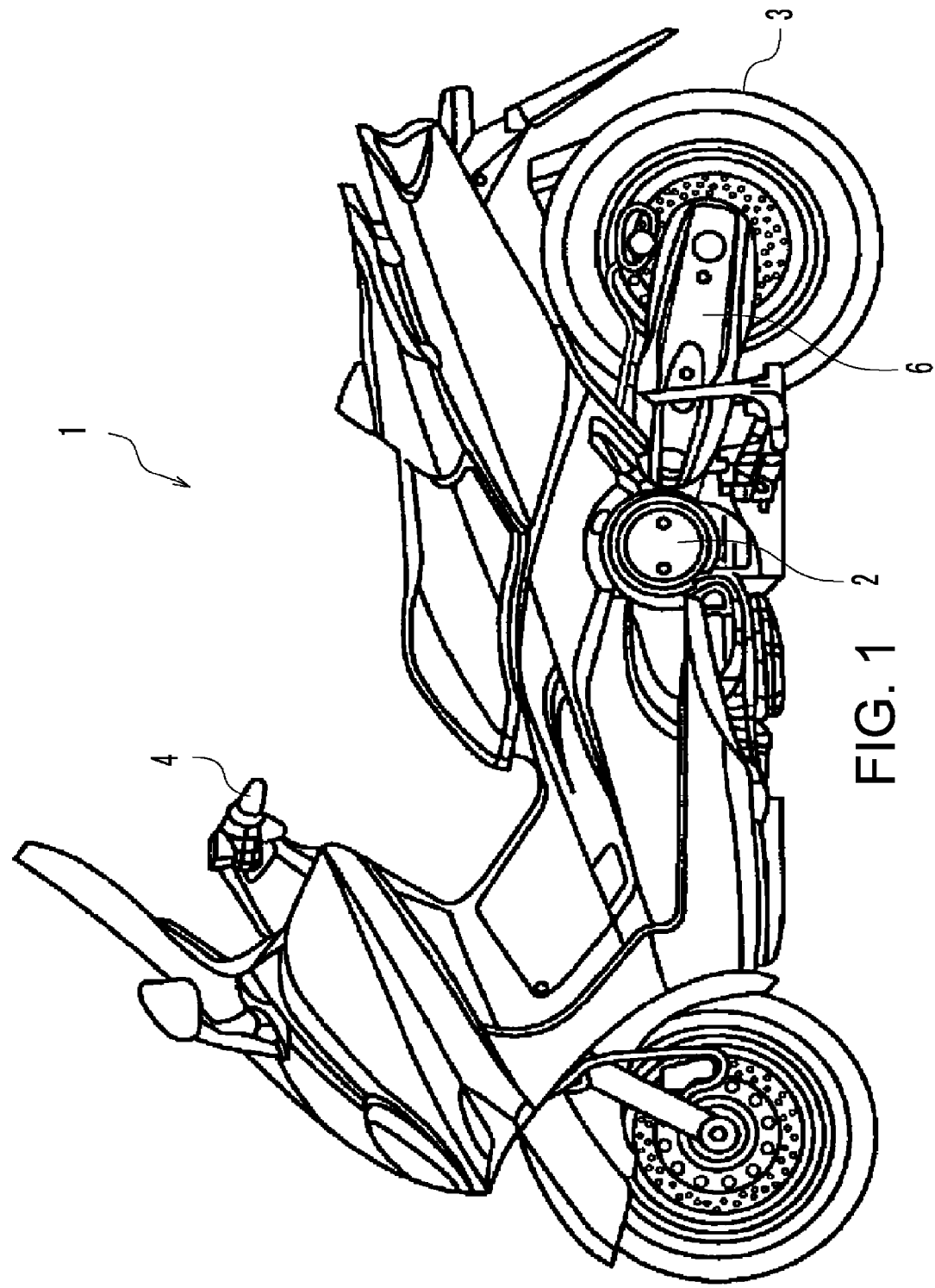
FIG. 1 is a side view of a motorcycle to which the present invention is applied.

A continuously variable transmission control device according to an embodiment of the present invention will be explained with reference to the attached drawings. The following explanation will be directed to a scooter motorcycle 1 to which the present invention can be preferably applied. However, it should be understood that the continuously variable transmission control device is not limited to the above and can also be applied to various vehicles. As shown in FIG. 1, the motorcycle 1 includes a handle 4, a power unit 2, and a rear wheel 3 as a driving wheel. The power unit 2 and the rear wheel 3 are connected by a force transmission mechanism 6.

(Handle 4)

Figure 2:
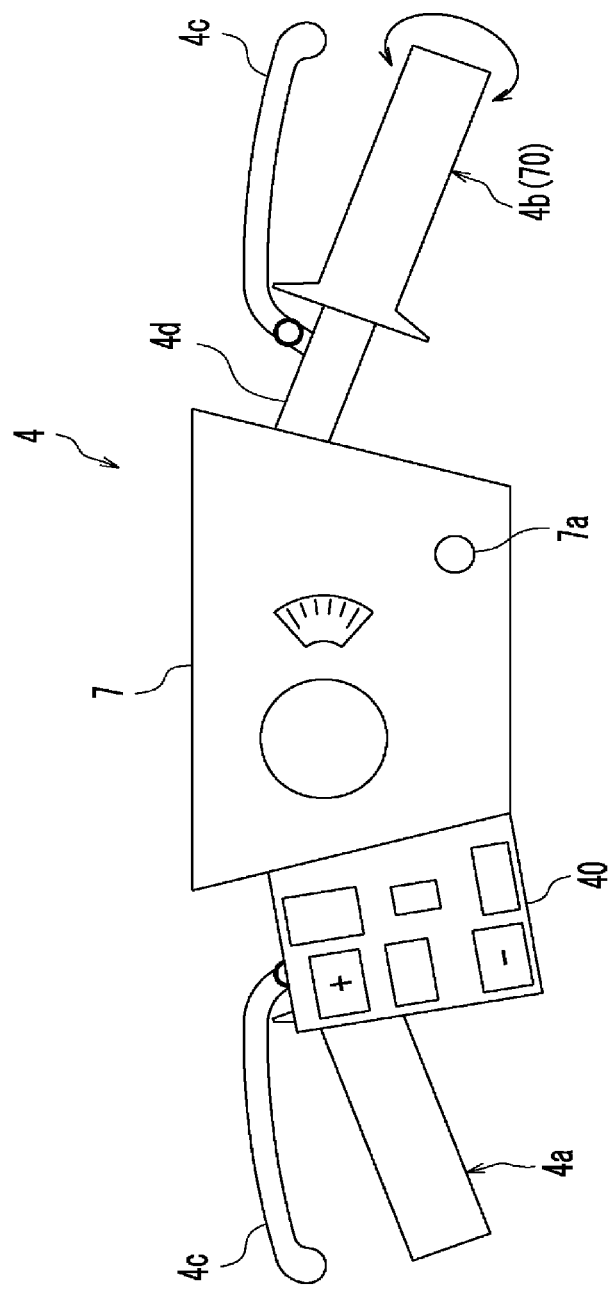
FIG. 2 shows a schematic structural view showing a handle part of the motorcycle.
Figure 3:
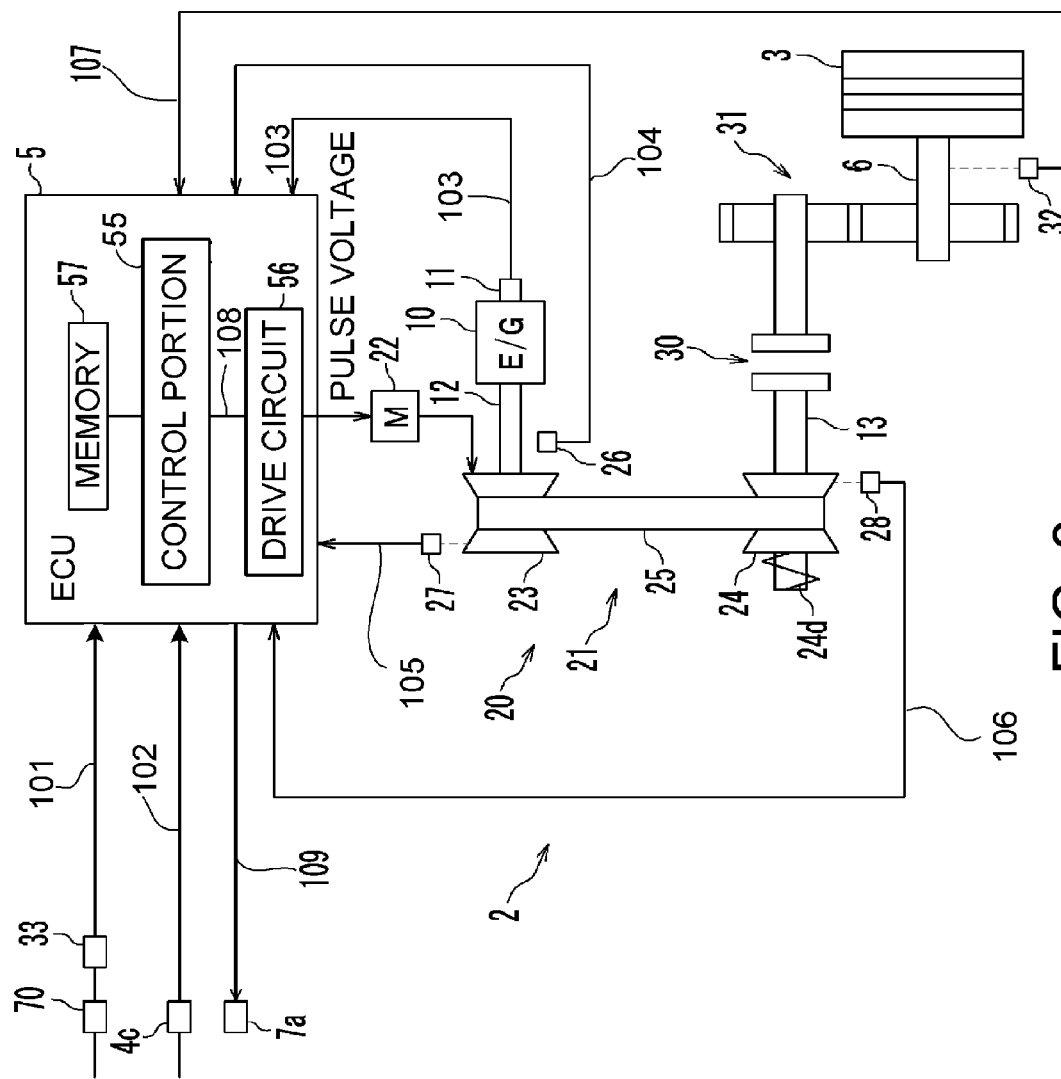
FIG. 3 is a block diagram of a control device of the motorcycle.

FIG. 2 shows an overview of the structure of the handle 4. The handle 4 includes a handle bar 4d connected to a steering head pipe (not illustrated). The handle 4 includes a left grip section 4a positioned at the left end of the handle bar 4d, and a right grip section 4b positioned at the right end of the handle bar 4d. The right grip section 4b can be rotated with respect to the handle bar 4d. When the rider rotates the right grip section 4b, a throttle 70 shown in FIG. 3 is operated and the throttle opening degree is adjusted.

Brake levers 4c are positioned near each of the grip sections 4a and 4b. When the brake (not shown in the figures) of the motorcycle 1 is operated by the rider operating these brake levers 4c, a brake signal 102 is outputted to an ECU 5, as described later.

A switch box 40 is positioned on the right side of the left grip section 4a. Various operation switches are provided on the switch box 40.

Additionally, there is a display panel 7 that displays a vehicle speed, remaining fuel, etc., in the center section of the handle 4.

(Power Unit 2)

As shown in FIG. 3, the power unit 2 includes an engine 10 as a drive source, an electronically controlled transmission 20, a centrifugal clutch 30, and a speed reduction mechanism 31. The transmission 20 includes a continuously variable change gear mechanism 21 and a motor 22 that acts as an actuator for varying the transmission ratio of the change gear mechanism 21.

Figure 4:
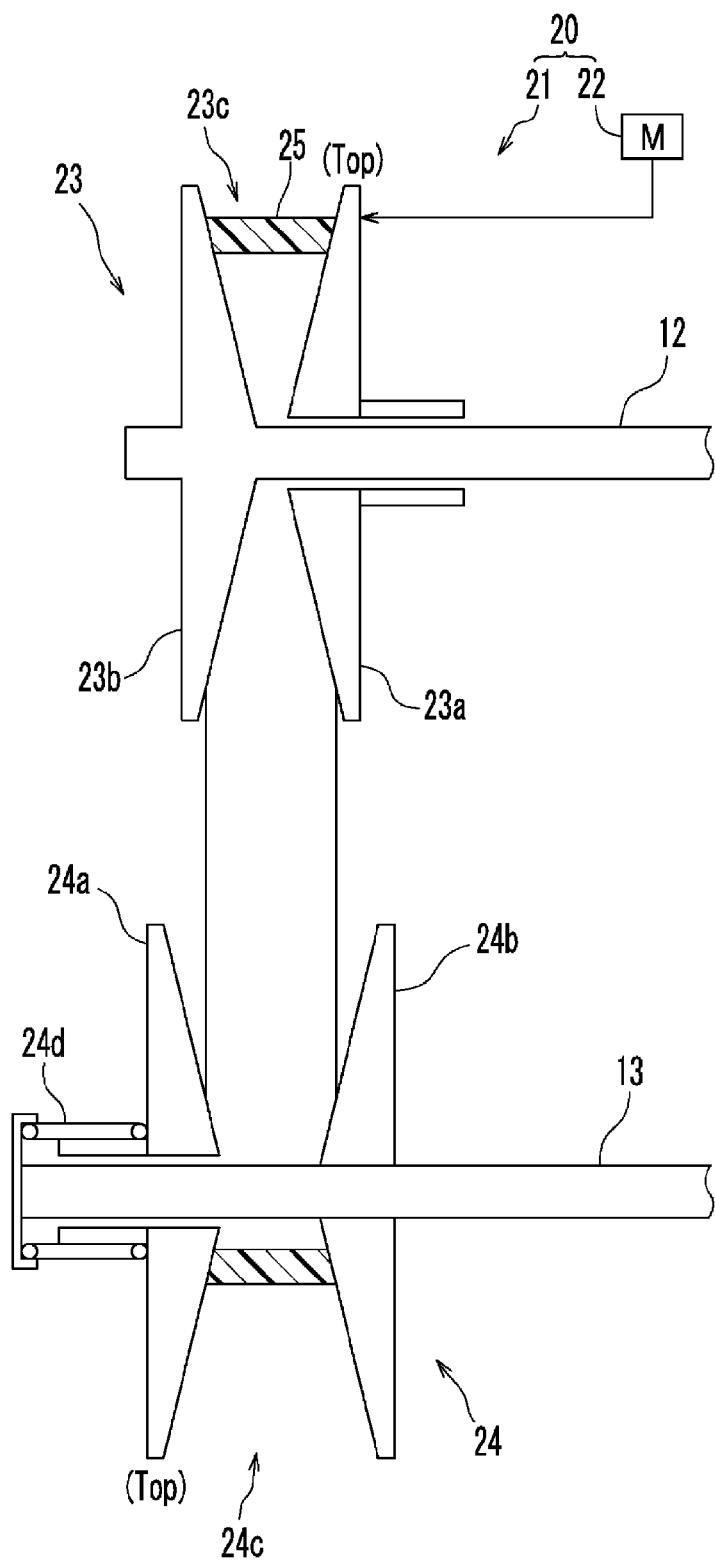
FIG. 4 is a diagram showing a transmission of the motorcycle when the transmission ratio is at Top.

The change gear mechanism 21 is structured so that the transmission ratio can be continuously varied. Specifically, as shown in FIG. 4, the change gear mechanism 21 includes an input shaft 12, an output shaft 13, a primary sheave 23, and a secondary sheave 24. A belt 25 with a generally V-shaped cross section is wound around the primary sheave 23 and the secondary sheave 24. In this embodiment, the belt 25 is a rubber belt.

As shown in FIG. 4, the primary sheave 23 includes a movable sheave 23a and a fixed sheave 23b. The movable sheave 23a is provided on the input shaft 12 in an axially movable manner. On the other hand, the fixed sheave 23b is fixed to the input shaft 12 in an axially immovable manner. Note that the movable sheave 23a and the fixed sheave 23b are attached to the input shaft 12 unrotatable relative to the input shaft 12, so they rotate together with the input shaft 12. Additionally, a belt groove 23c that extends and widens in the radially outward direction thereof is formed by the movable sheave 23a and the fixed sheave 23b.

The above-described motor 22 is connected to the primary sheave 23. The motor 22 drives the movable sheave 23a and slides the movable sheave 23a in the axial direction of the input shaft 12. When the movable sheave 23a slides, it varies the width of the belt groove 23c of the primary sheave 23. This moves the belt 25 put on the primary sheave 23 toward the radially outward or radially inward direction of the primary sheave 23.

The secondary sheave 24 includes a movable sheave 24a and a fixed sheave 24b. The movable sheave 24a is provided on the output shaft 13 in an axially movable manner. On the other hand, the fixed sheave 24b is fixed to the output shaft 13 in the axially immovable manner. Note that the movable sheave 24a and the fixed sheave 23b are attached to the output shaft 13 unrotatable relative to the output shaft, so they rotate together with the output shaft 13. The movable sheave 24a is urged in a direction that narrows the width of a belt groove 24c by a spring 24d. Additionally, the belt groove 24c that extends and widens in the radially outward direction thereof is formed by the movable sheave 24a and the fixed sheave 24b.

With this kind of structure, as shown in FIG. 4, when the motor 22 slides the movable sheave 23a of the primary sheave 23 toward the fixed sheave 23b, the width of the belt groove 23c of the primary sheave 23 narrows, which increases the winding radius of the belt 25 at the primary sheave 23 side. Accompanying this action, along with the belt 25 in the belt groove 24c of the secondary sheave 24 moving in the radially inward direction of the secondary sheave 24, the movable sheave 24a of the secondary sheave 24 moves in the direction away from the fixed sheave 24b against the urging force of the spring 24d. Thus, the winding radius of the belt 25 at the secondary sheave 24 side is reduced. In this way, the transmission ratio becomes smaller, and the movable sheaves 23a and 24a move closer to the so-called Top position at which the transmission ratio is at a minimum.

Figure 5:
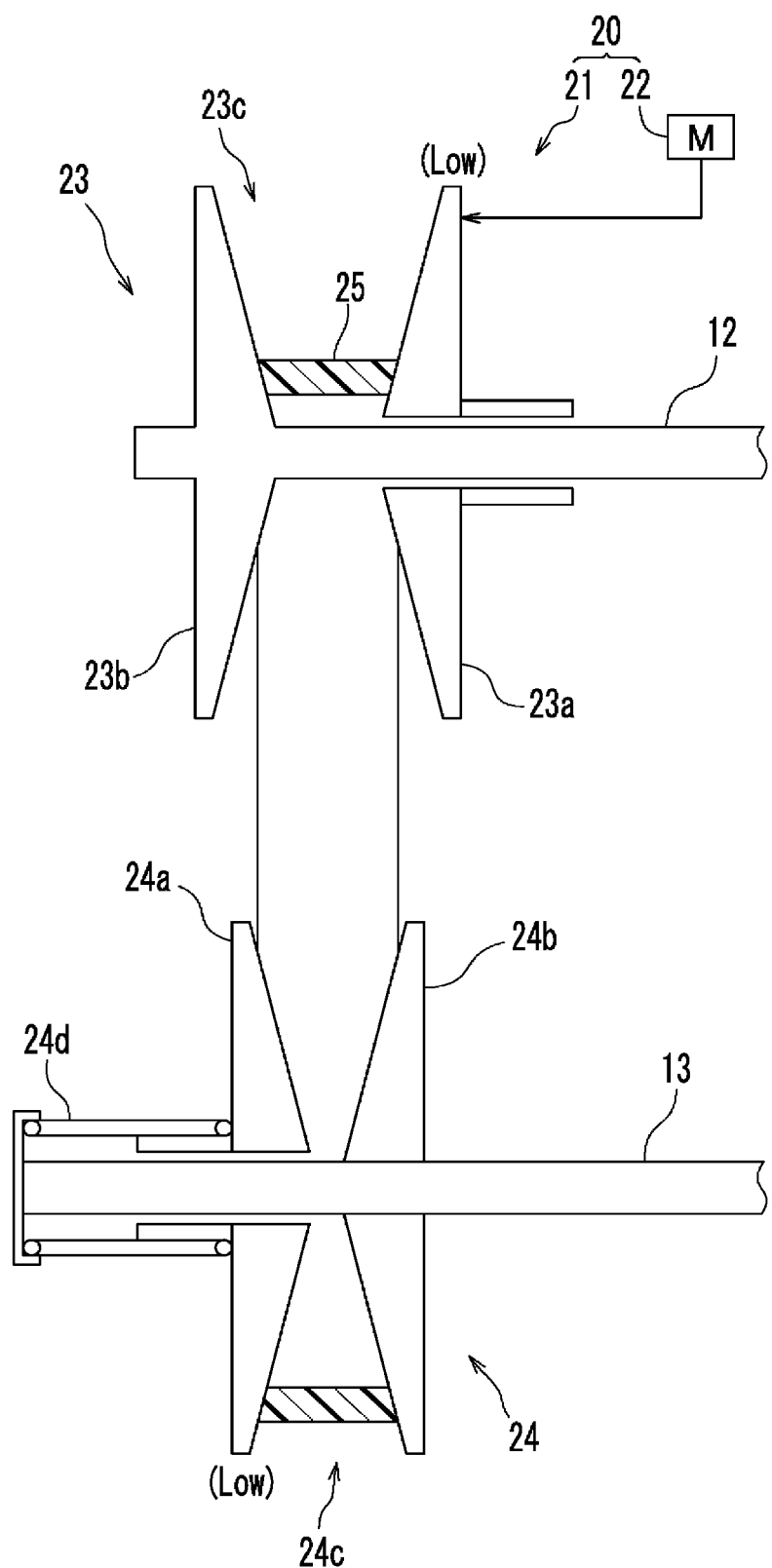
FIG. 5 is a diagram showing the transmission when the transmission ratio is at Low.

On the other hand, as shown in FIG. 5, if the motor 22 slides the movable sheave 23a of the primary sheave 23 in the direction away from the fixed sheave 23b, the width of the belt groove 23c of the primary sheave 23 widens, and the winding radius of the belt 25 at the primary sheave 23 side is reduced. Accompanying this action, along with the belt 25 in the belt groove 24c of the secondary sheave 24 moving in the radially outward direction of the secondary sheave 24, the movable sheave 24a of the secondary sheave 24 moves toward the fixed sheave 24b by the urging force of the spring 24d. This enlarges the winding radius of the belt 25 at the secondary sheave 24 side. In this way, the transmission ratio becomes larger, and the movable sheaves 23a and 24a move closer to a Low position at which the transmission ratio is at a maximum.

Furthermore, as shown in FIG. 3, the output shaft 13 is connected to the speed reduction mechanism 31 via the centrifugal clutch 30. The speed reduction mechanism 31 is connected to the rear wheel 3 via the force transmission mechanism 6, such as, e.g., a belt, a chain and a drive shaft. Thus, the centrifugal clutch 30 is positioned between the output shaft 13 of the change gear mechanism 21 and the rear wheel 3 that is a driving wheel.

The centrifugal clutch 30 is engaged and disengaged according to the rotation speed of the secondary sheave 24. Specifically, if the rotation speed of the secondary sheave 24 has not reached a stipulated rotation speed, the centrifugal clutch 30 is in a disengaged state. Thus, rotation of the secondary sheave 24 is not transmitted to the rear wheel 3. On the other hand, if the rotation speed of the secondary sheave 24 is at or above the stipulated rotation speed, the centrifugal clutch 30 is engaged. Thus, rotation of the secondary sheave 24 is transmitted to the rear wheel 3 via the centrifugal clutch 30, the speed reduction mechanism 31, and the force transmission mechanism 6. This causes rotation of the rear wheel 3.

<<Control System of Motorcycle 1>>

Hereinafter, a control system of the motorcycle 1 will be explained with reference to FIG. 3. As shown in FIG. 3, control of the motorcycle 1 is mainly performed by the ECU (electronic control unit) 5 acting as a control device. The ECU 5 includes a memory 57 that saves a pre-set transmission ratio and various settings, a control portion 55, and a drive circuit 56 that drives the motor 22. The control portion 55 performs the sheave position control (normal control of the transmission ratio of the invention) that slides the movable sheave 23*a* of the primary sheave 23 in order to vary the transmission ratio.

Various sensors and switches are connected to the ECU 5. Specifically, a throttle opening sensor 33, the brake levers 4*c*, an engine rotation speed sensor 11, a sheave position sensor 26, a primary sheave rotation speed sensor 27, a secondary sheave rotation speed sensor 28, and a vehicle speed sensor 32 are connected to the ECU 5.

The throttle opening sensor 33 detects the throttle opening degree of the motorcycle 1. The throttle opening sensor 33 is connected to the throttle 70. The throttle opening sensor 33 outputs the detected throttle opening degree to the ECU 5 as a throttle opening degree signal 101. When the brake lever 4*c* is being operated by a rider, the brake signal 102 is outputted to the ECU 5. In other words, the brake lever 4*c* continuously outputs the brake signal 102 starting from when the brake lever 4*c* is operated by the rider to when the rider stops operating the brake lever 4*c*.

The engine rotation speed sensor 11 detects the rotation speed of the engine 10. The engine rotation speed sensor 11 outputs the detected rotation speed of the engine 10 to the ECU 5 as an engine rotation speed signal 103.

The sheave position sensor 26 is a sensor for detecting the transmission ratio of the change gear mechanism 21. Specifically, the sheave position sensor 26 detects the width of the belt groove 23*c* of the primary sheave 23 (see FIG. 4, FIG. 5). For example, in cases where the primary sheave 23 includes the fixed sheave 23*b* and the movable sheave 23*a* that can change position relative to the fixed sheave 23*b* as in this embodiment, the sheave position sensor 26 detects the position of the movable sheave body in relation to the fixed sheave 23*b*. The sheave position sensor 26 outputs the position of the movable sheave 23*a* to the ECU 5 as a sheave position signal 104.

The primary sheave rotation speed sensor 27 detects the rotation speed of the primary sheave 23. The primary sheave rotation speed sensor 27 outputs the detected rotation speed of the primary sheave 23 to the ECU 5 as a primary sheave rotation speed signal 105.

The secondary sheave rotation speed sensor 28 detects the rotation speed of the secondary sheave 24. The secondary sheave rotation speed sensor 28 outputs the detected rotation speed of the secondary sheave 24 to the ECU 5 as a secondary sheave rotation speed signal 106.

The vehicle speed sensor 32 detects the vehicle speed of the motorcycle 1. The vehicle speed sensor 32 outputs the detected vehicle speed to the ECU 5 as a vehicle speed signal 107. Although the vehicle speed sensor 32 can be a device that detects the rotation speed of the rear wheel 3, the vehicle speed sensor 32 can be a sensor for acquiring the vehicle speed by detecting, for example, the rotation speed of the output shaft of the speed reduction mechanism 31. Additionally, the vehicle speed sensor 32 can be a sensor for acquiring the vehicle speed by detecting the rotation speed of the front wheel.

(Control Overview of ECU 5)

—Engine Control—

The ECU 5 performs control of the engine 10. Specifically, the ECU 5 calculates a target engine rotation speed based on, e.g., the throttle opening signal 101 and/or the vehicle speed signal 107. The ECU 5, while monitoring the engine rotation speed signal 103, controls the rotation speed, and the like, of the engine 10 so that it is at the calculated target engine rotation speed by adjusting an ignition period of an ignition device (not shown) of the engine 10 and a fuel supply amount supplied to the engine 10.

—Shift Control—

Additionally, the ECU 5 performs control of the transmission 20. Specifically, when turning on the power to activate, the ECU 5 first performs starting control to confirm rotation of the belt 25. Moreover, once the rotation of the belt 25 is confirmed by the starting control, the sheave position control (normal control of the transmission ratio of the invention) to vary the transmission ratio is performed.

<<Starting Control>>

In the starting control, when detection of the rotation of the belt 25 of the change gear mechanism 21 is performed and rotation of the belt 25 is detected, the sheave position control starts. Note that, in this embodiment of the present invention, a belt rotation detection sensor of the invention is the secondary sheave rotation speed sensor 28 that detects the rotation speed of the secondary sheave 24. Thus, the control portion 55 of the ECU 5 determines whether the belt 25 is rotating from the rotation speed of the secondary sheave 24 detected by the secondary sheave rotation speed sensor 28. If it is determined that the belt 25 is rotating, the sheave position control starts. Hereinafter, the flow of the starting control is described in detail with reference to FIG. 6.

Figure 6:
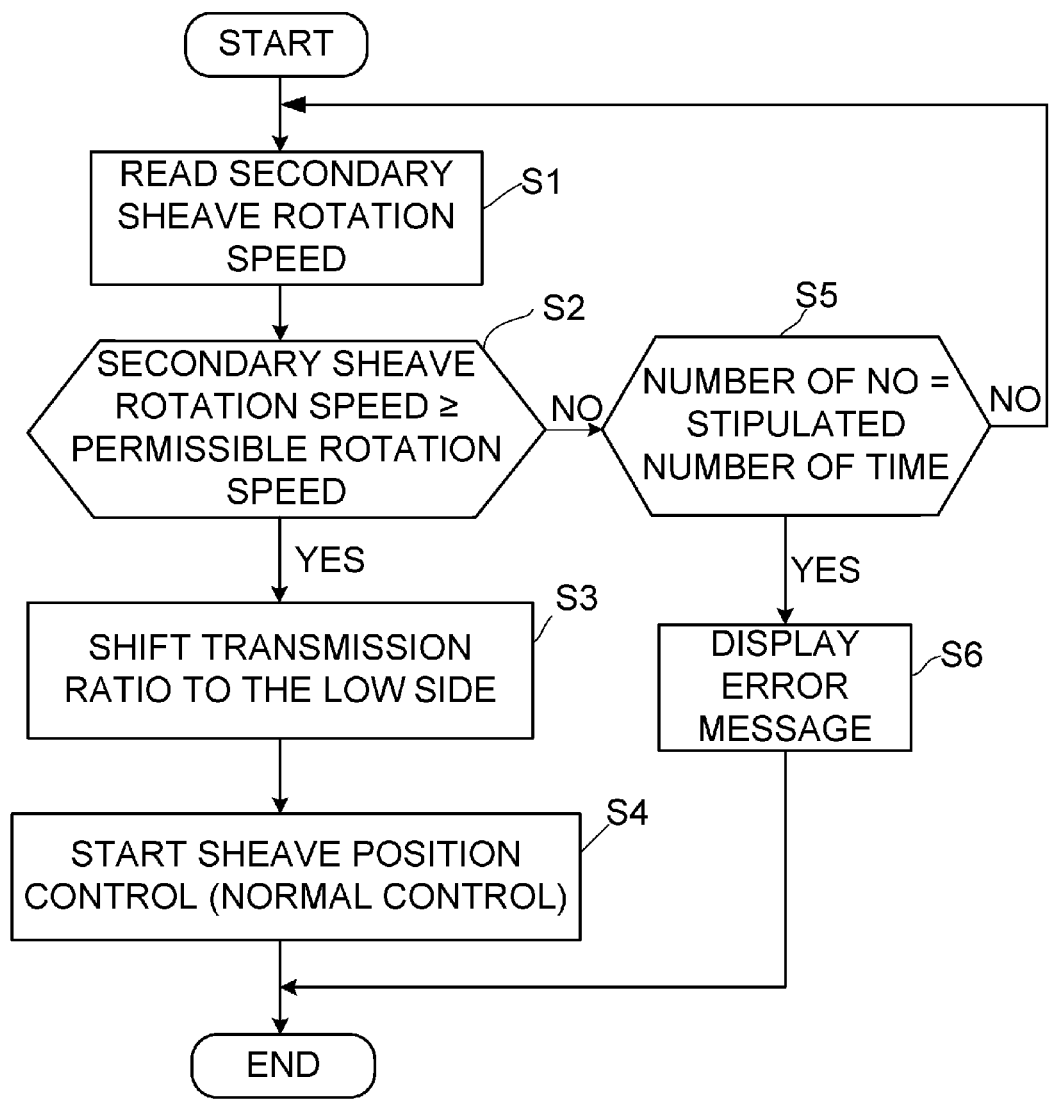
FIG. 6 is a flow chart showing the flow of starting control.

First, as shown in FIG. 6, the rotation speed of the secondary sheave 24 detected by the secondary sheave rotation speed sensor 28 is read by the ECU 5 as the secondary sheave rotation speed signal (see FIG. 3) 106 (Step S1).

When the secondary sheave rotation speed signal 106 is read, the ECU 5 determines whether or not the rotation speed of the secondary sheave 24 is at or above a stipulated permissible rotation speed (Step S2). If the determination by the ECU 5 is YES at Step S2, in other words, if it is determined that the rotation speed of the secondary sheave 24 is at or above a stipulated permissible rotation speed, the routine proceeds to Step S3.

At Step S3, the control portion 55 of the ECU 5 controls the motor 22 until the transmission ratio shifts to the Low side. As a result, the movable sheave 23*a* of the primary sheave 23 moves toward the Low position. Moreover, when it is detected that the movable sheave 23*a* of the primary sheave 23 has moved to the Low position based on the sheave position signal 104 inputted from the sheave position sensor 26, the routine proceeds to Step S4.

At Step S4, the control portion 55 starts the sheave position control (in other words, the normal control of the transmission ratio). Thus, the starting control is terminated.

On the other hand, if the determination at Step S2 is NO, in other words, if it is determined that the rotation speed of the secondary sheave 24 has not reached the stipulated permissible rotation speed, the routine proceeds to Step S5.

First, at Step S5, it is determined whether or not the cumulative number of NO determinations at Step S2 has reached a stipulated number of times. If the determination at Step S5 is YES, in other words, if it is determined that the number of NO determinations at Step S2 has reached the stipulated number of times, the routine proceeds to Step S6.

At Step S6, display of an error message is performed. The purpose of this error message display is to inform the rider that the primary sheave 23 continues to rotate idly without the belt 25. In this embodiment, as shown in FIG. 2, there is an error warning light 7a on the display panel 7, and the control portion 55 transmits an error message signal 109 to the error warning light 7a to illuminate the error warning light 7a. Thus, the error message display is performed. Then, the starting control is terminated.

If the determination at Step S5 is NO, in other words, if it is determined that the cumulative number of NO determinations at Step S2 has not reached the stipulated number of times, the routine returns to Step S1 to repeat each Step. Note that, the cumulative number of NO determinations at Step S2 is counted by a counter that is not shown in the figures. Furthermore, when the routine returns from Step 5 to Step S1, the cumulative number counted by the counter increases by one. Note that the counter will be reset upon completion of the starting control.

<<Sheave Position Control>>

When rotation of the belt 25 is confirmed by the starting control, the ECU 5 performs the sheave position control for varying the transmission ratio of the transmission 20. The ECU 5, based on a transmission ratio map saved beforehand in the memory 57, controls the sheave position by driving the motor 22.

Specifically, the memory 57 within the ECU 5 stores a driving state of the motorcycle 1, such as, e.g., the vehicle speed of the motorcycle 1, the engine rotation speed and the throttle opening degree, and the transmission ratio map which stipulates the relationship with the transmission ratio. The control portion 55 shown in FIG. 3 calculates the target transmission ratio based on this transmission ratio map, the vehicle speed signal 107 and the engine rotation speed signal 103, etc. The control portion 55 outputs a PWM signal 108 that is based on the calculated target transmission ratio, the sheave position signal 104 and the secondary sheave rotation speed signal 106 to the drive circuit 56. The drive circuit 56 applies a pulse voltage in accordance with the PWM signal 108 to the motor 22. This drives the motor 22 to adjust the belt groove width of the primary sheave 23. As a result, the transmission ratio of the transmission 20 is changed up to the target transmission ratio.

Note that, in this embodiment, the explanation is directed to an example in which the actuator for varying the transmission ratio of the change gear mechanism 21 is a motor 22 controlled by PWM. However, in the invention, there is no particular limitation on what type of actuator is used to vary the transmission ratio of the transmission 20. For example, the actuator for varying the transmission ratio of the transmission 20 can be a motor controlled by PAM (pulse amplitude modulation). Alternatively, the actuator for varying the transmission ratio of the transmission 20 can be a step motor. Alternatively, the actuator for varying the transmission ratio of the transmission 20 can be a hydraulic actuator, etc.

As shown above, according to the control device (ECU 5) of the transmission 20 of this embodiment, the sheave position control (normal control) is performed after detecting the rotation of the belt 25. Thus, while the primary sheave 23 is rotating idly without the belt 25, the sheave position control is not performed. As a result, it is possible to prevent impacts from occurring at the time of starting the vehicle due to the initiation of sheave position control during the idle rotation of the primary sheave 23. Thus, with the control device (ECU 5) of this transmission 20, accurate transmission ratio control can be realized, and ECTV control problems can be prevented from occurring.

In this embodiment, the secondary sheave rotation speed signal 106 from the secondary sheave rotation speed sensor 28 is inputted to the control device (ECU 5) of the transmission 20, and the control device (ECU 5) detects the rotation of the belt 25 from the rotation speed of the secondary sheave 24. Thus, according to this embodiment, the comparatively less expensive secondary sheave rotation speed sensor 28 can be used as the belt rotation detection sensor of the invention.

Meanwhile, in cases where the sheave position control in accordance with the engine speed starts as in a conventional ECVT control device, the idle rotation of the primary sheave 23 rotating without the belt 25 cannot be detected, which may cause initiation of the sheave position control despite the state in which the primary sheave 23 is rotating idly. To solve this problem, in addition to the engine speed, the vehicle speed can be detected to determine whether the primary sheave 23 is rotating idly. Specifically, in cases where the vehicle speed is zero despite the fact that the engine speed has surpassed the stipulated engine speed, it can be determined that the primary sheave 23 is idly rotating. Thus, it is possible to prevent the sheave position control from starting by detecting idle rotation of the primary sheave 23 in this way.

In the transmission 20 of this embodiment, however, the centrifugal clutch 30 is placed between the output shaft 13 and the rear wheel 3 which is a driving wheel. In this kind of transmission 20, in cases where the vehicle speed is detected in addition to the engine speed, the centrifugal clutch 30 is disengaged if the rotation speed of the secondary sheave 24 is lower than the stipulated rotation speed even if the belt 25 is rotating. This prevents transmission of the force from the engine 10 to the driving wheel (rear wheel 3). As a result, even if the belt 25 is rotating, there is a possibility that the sheave position control will not start because the vehicle speed is zero. As a result, the sheave position control will not start if the rotation speed of the secondary sheave 24 is not at or above the stipulated rotation speed. Thus, there arises a problem that it takes a time delay to initiate the sheave position control.

With the control device (ECU 5) of the transmission 20, however, rotation of the belt 25 is detected and the sheave position control starts when the belt 25 starts to rotate. Thus, the sheave position control can be prevented from starting despite that the primary sheave 23 is rotating idly. In addition, despite that the belt 25 is rotating, the sheave position control can be prevented from not starting despite that the primary sheave 23 is rotating. Thus, with this transmission 20, accurate control of the transmission ratio by the transmission 20 can be realized and control problems related to the ECVT can be avoided in advance.

Meanwhile, if the power is turned OFF just after sudden braking, the movable sheave 23a of the primary sheave 23 may sometimes stop without returning to the Low position. In such a case, if the power is turned ON again, the width of the belt groove 23c enlarges because the movable sheave 23a of the primary sheave 23 returns once to the Low position. If this happens, despite that the belt 25 is not rotating, the belt 25 will become slack and the primary sheave 23 will rotate idly since only the belt groove 23c of the primary sheave 23 enlarges.

In this embodiment, the belt 25 is a rubber belt. Furthermore, a rubber belt is more likely to become slack if tension is eliminated in comparison with a metallic belt. Thus, as previously mentioned, if the power is turned OFF just after sudden braking and the movable sheave 23a of the primary sheave 23 stops without fully returning to the Low position, the chance of idle rotation occurring with the primary sheave 23 is higher in the transmission 20 that uses a rubber belt than in a transmission that uses a metallic belt. With the control device (ECU 5) of the transmission 20, however, the sheave position control (normal control) is performed after rotation of the belt 25 is detected. Thus, while the primary sheave 23 is rotating idly without the belt 25, the sheave position control (normal control) will not be performed. Therefore, using the control device of the invention to control the transmission 20 that uses the rubber belt as in this embodiment is especially effective and allows the above-described effects to be further exerted more effectively.

Furthermore, when the belt 25 is not rotating, the control portion 55 of the control device (ECU 5) of the transmission 20 repeatedly performs determination of whether the belt 25 is rotating up to the stipulated number of times. When the determinations indicating that the belt 25 has not rotated repeat by a stipulated number of times, the control portion 55 determines that the primary sheave 23 is continuously rotating idly and illuminates an error warning light 7a. Thus, according to the control device (ECU 5) of this transmission 20, the operator (rider) is notified that the primary sheave 23 is continuously rotating idly.

Furthermore, when detecting the rotation of the belt 25, the control portion 55 of the control device (ECU 5) of the transmission 20 once controls the motor 22 so that the transmission ratio is shifted to the Low side, and then initiates the sheave position control (normal control) (Step S3, Step S4 in FIG. 6). Thus, according to the control device (ECU 5) of the transmission 20, the transmission ratio is definitely shifted to the Low side even in cases where the primary sheave 23 stops without having fully returned to the Low position, which makes it possible for the transmission ratio to increase from the Low side. Thus, according to the control device (ECU 5) of the transmission 20, smooth acceleration is possible when the power is turned ON even in cases where the power had previously been turned OFF with the movable sheave 23a of the primary sheave 23 not having fully returned to the Low position.

<First Modification>

Figure 7:
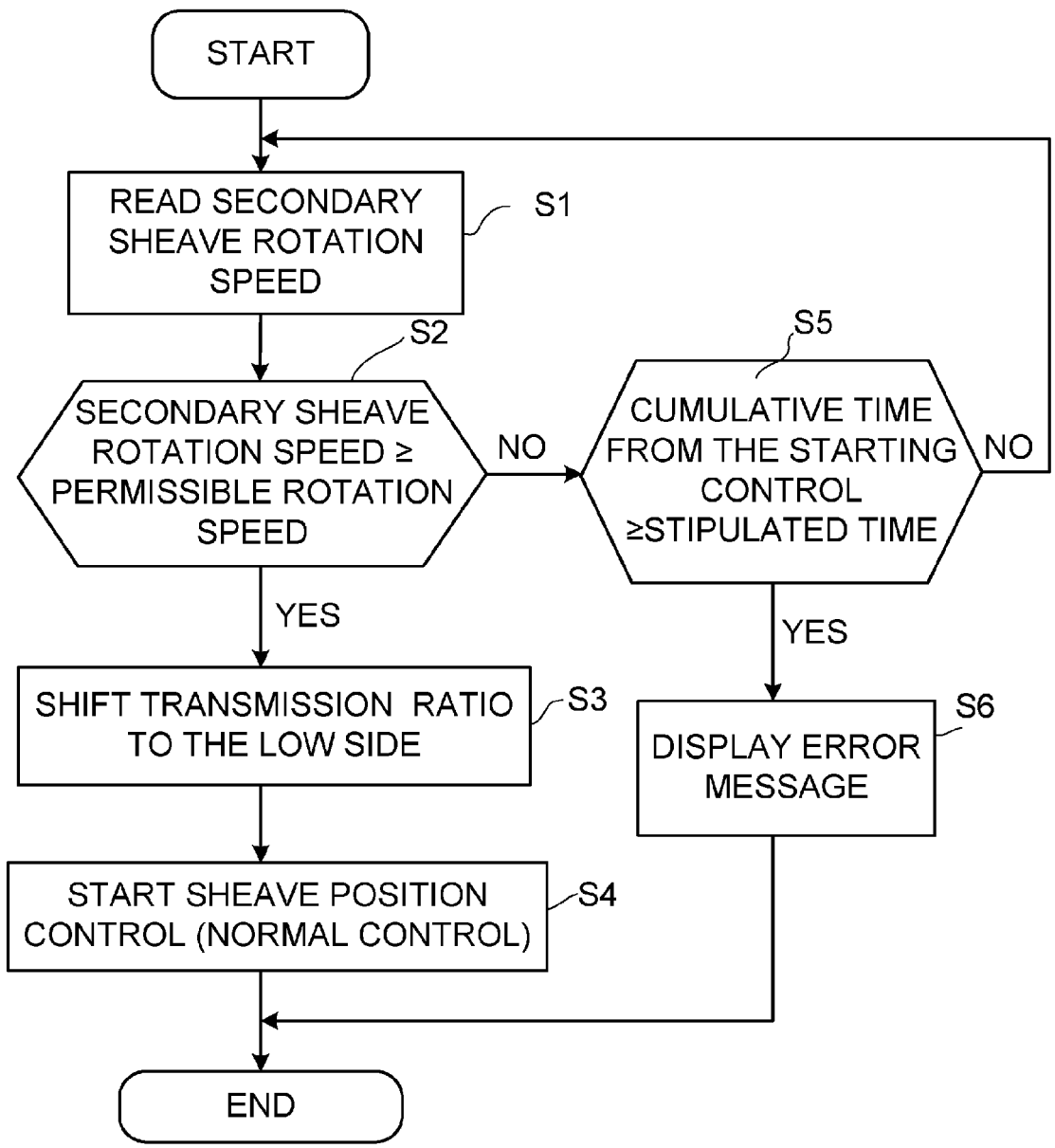
FIG. 7 is a flow chart showing a flow of starting control of a first modification.

In the above-described embodiment, when the cumulative number of times that the rotation speed of the secondary sheave 24 has not reached a stipulated permissible rotation speed reaches a stipulated number of times, the control portion 55 discriminates that the primary sheave 23 is continuously rotating idly and an error message is displayed. In the control portion 55 of a first modification, as shown in FIG. 7, when the cumulative time from the start of the starting control to the present time reaches or exceeds a stipulated time, the control portion 55 discriminates that the primary sheave 23 is continuously rotating idly and an error message is displayed. Hereinafter, the starting control of the first modification will be described in detail. Because Steps S1 to S4 are the same as in the above-described embodiment, the explanation will be omitted.

In the first modification, at Step S5 of the starting control, it is determined whether the cumulative time from the start of the starting control to the present time has reached or exceeded the stipulated time. Moreover, if the determination at Step S5 is YES, in other words, if it is determined that the cumulative time from the start of the starting control to the present time has reached or exceeded the stipulated time, the routine proceeds to Step S6. At Step S6, the same error message as in the above-described embodiment is displayed. Then, the starting control is terminated.

On the other hand, if the determination at Step S5 is NO, in other words, if it is determined that the cumulative time from the start of the starting control to the present time has not reached or exceeded the stipulated time, the routine returns to Step S1 to repeat each Step. The cumulative time from the start of the starting control to the present time is counted by a counter not shown in the figures. The counter is reset upon completion of the starting control.

In this way, when the belt 25 is not rotating, the control portion 55 of the control device (ECU 5) according to the first modification repeats determination of whether the belt 25 is rotating until the cumulative time from the start of the starting control to the present time reaches the stipulated time. When the NO determination at Step S2 (determination that the belt 25 is not rotating) has continued for a stipulated time or longer, the control portion 55 determines that the primary sheave 23 is continuously rotating idly and turns on the error warning light 7a. With this, the control device (ECU 5) of the first modification can also notify the operator (rider) of the fact that the primary sheave 23 is continuously rotating idly in the same way as in the above-described embodiment.

<Second Modification>

Figure 8:
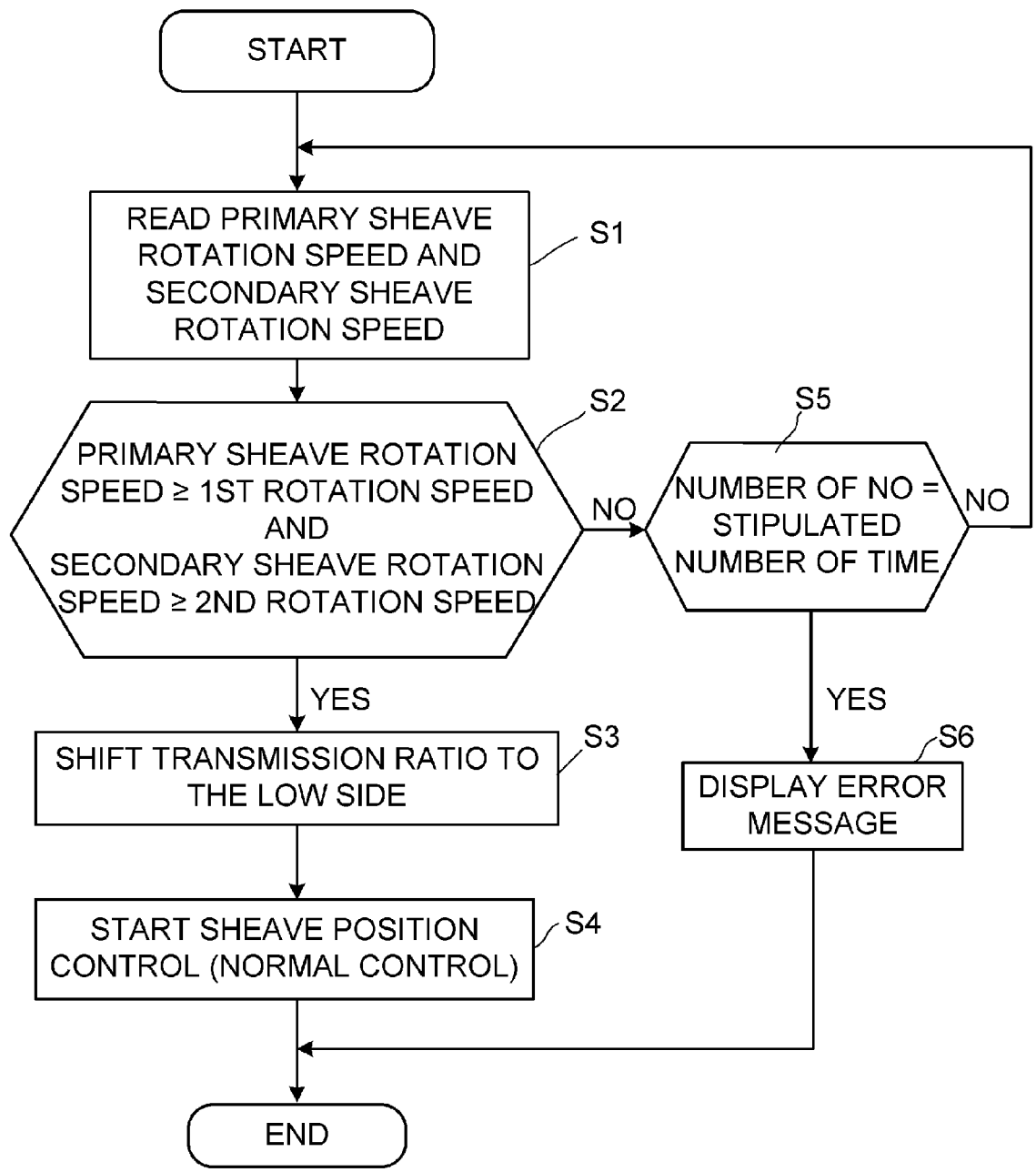
FIG. 8 is a flow chart showing a flow of starting control of a second modification.

In the above-described embodiment, in the starting control, the ECU 5 detects whether the belt 25 is rotating by determining whether the rotation speed of the secondary sheave 24 has reached or exceeded the stipulated permissible rotation speed. In this second modification, in the starting control, the ECU 5 detects rotation of the belt 25 not only based on the rotation speed of the secondary sheave 24 but also based on the rotation speed of the primary sheave 23. Hereinafter, starting control of the second modification is described in detail with reference to FIG. 8. Because Steps S3 to S6 are the same as in the above-described embodiment, the explanation will be omitted.

In the second modification, at Step S1 of the starting control, the rotation speed of the secondary sheave 24 detected by a secondary sheave rotation speed sensor 28 is read by the ECU 5 as a secondary sheave rotation speed signal 106 (see FIG. 3). Along with this, the rotation speed of the primary sheave 23 detected by the primary sheave rotation speed sensor 27 is also read by the ECU 5 as the primary sheave rotation speed signal 105 (see FIG. 3).

When the primary sheave rotation speed signal 105 and the secondary sheave rotation speed signal 106 are read, the control portion 55 of the ECU 5 determines whether or not the rotation speed of the primary sheave 23 has reached or exceeded a stipulated $1^{st}$ rotation speed and whether or not the rotation speed of the secondary sheave 24 has reached or exceeded a stipulated $2^{nd}$ rotation speed (Step S2). When the control portion 55 determines that the determination at Step S2 is YES, the routine proceeds to Step S3. On the other hand, when it is determined by the control portion 55 that the determination at Step S2 is NO, the routine proceeds to Step S5.

However, according the control device (ECU 5) of the second modification, it is determined whether the belt 25 is rotating not only based on the rotation speed of the secondary sheave 24 but also based on the rotation speed of the primary sheave 23. Thus, according to the control device (ECU 5) of the second modification, rotation of the belt 25 can be more reliably detected. Therefore, according to the control device (ECU 5) of the second modification, more accurate starting control can be realized and ECVT control defect can be prevented from occurring.

Note that, the method for detecting rotation of the belt 25 based on the rotation speed of the primary sheave 23 and the rotation speed of the secondary sheave 24 is not necessarily limited to a method that uses the rotation speeds of the primary sheave 23 and the secondary sheave 24. Rotation of the belt 25 can be detected based on the number of variables including the rotation speed of the primary sheave 23 and the rotation speed of the secondary sheave 24. For example, rotation of the belt 25 can be detected by calculating the actual transmission ratio from the rotation speed of the primary sheave 23 and the rotation speed of the secondary sheave 24 and then comparing this actual transmission ratio with the pre-set transmission ratio.

<Third Modification>

The control device (ECU 5) of a third modification uses, instead of the secondary sheave rotation speed sensor 28, a gap sensor 61 as a belt rotation detection sensor that detects unevenness of the belt 25.

Figure 9:
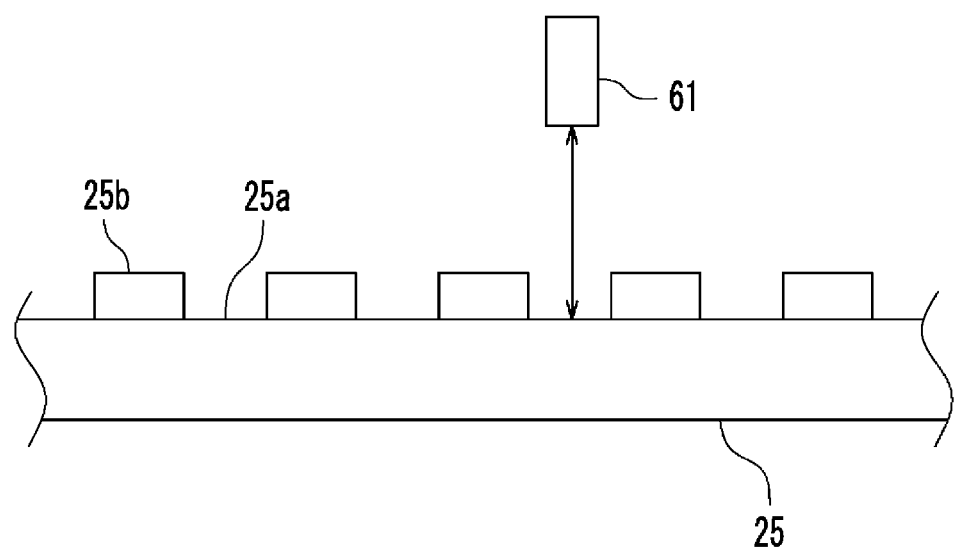
FIG. 9 is a diagram showing a belt rotation detection sensor of a third modification.

As shown in FIG. 9, the gap sensor 61 measures the distance from the gap sensor 61 to the belt 25 and detects whether the portion of the belt 25 facing the gap sensor 61 is a concave section 25a or a convex section 25b of the belt 25 based on the difference of this distance. For example, the gap sensor 61 is positioned so that a detection signal is sent to the ECU 5 when the concave section 25a passes the gap sensor 61. Thus, the ECU 5 can calculate the rotation speed of the belt 25 by measuring the number of times the detection signal has been sent from the gap sensor 61 within a specified time period.

In this way, in cases where the gap sensor 61 is used as the belt rotation detection sensor, it is possible to more directly detect whether the belt 25 is rotating. Thus, according to the control device (ECU 5) of the third modification, more accurate starting control can be realized and ECVT control defect can be prevented from occurring.

<Fourth Modification>

The control device (ECU 5) of a fourth modification uses, instead of the secondary sheave rotation speed sensor 28, a sensor 62 as the belt rotation detection sensor that detects a stripe pattern on the belt 25.

Figure 10A:
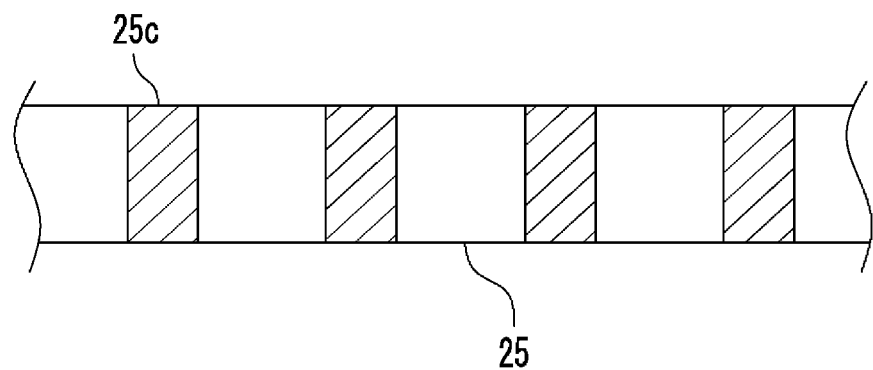
Figure 10B:
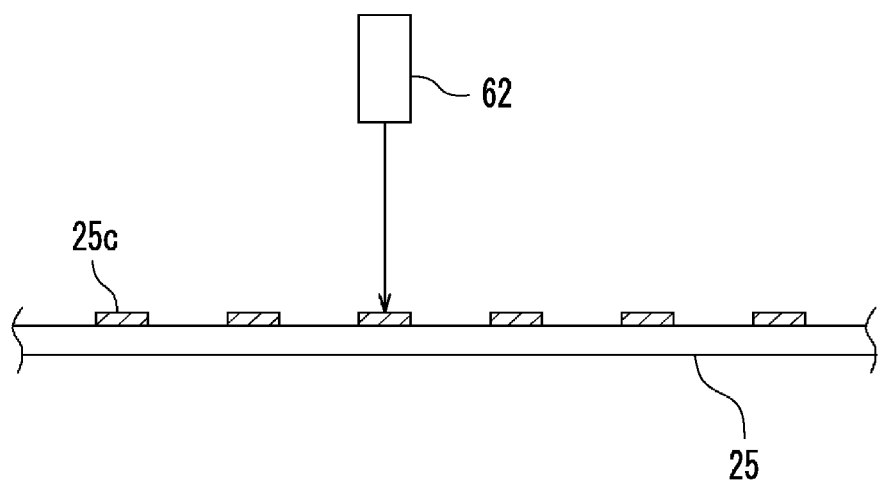

As shown in FIG. 10A, a pattern 25c to be detected optically or magnetically is formed in advance in a striped formation on the belt 25 of the fourth modification. An optical or magnetic sensor that can detect the pattern 25c to be detected optically or magnetically is used as the sensor 62. Furthermore, the sensor 62 is positioned so that a detection signal is sent to the ECU 5 from the sensor 62 when the striped formation pattern 25c passes the sensor 62. Thus, the ECU 5 can calculate the rotation speed of the belt 25 by measuring the number of times the detection signal is sent from the sensor 62 within a stipulated time period.

In this way, in cases where the optical sensor or the magnetic sensor 62 is used as the belt rotation detection sensor, it is possible to more directly detect whether the belt 25 is rotating. Thus, according to the control device (ECU 5) of the fourth modification, more accurate starting control can be realized and ECVT control defect can be prohibited from occurring.

Second Embodiment

Figure 11:
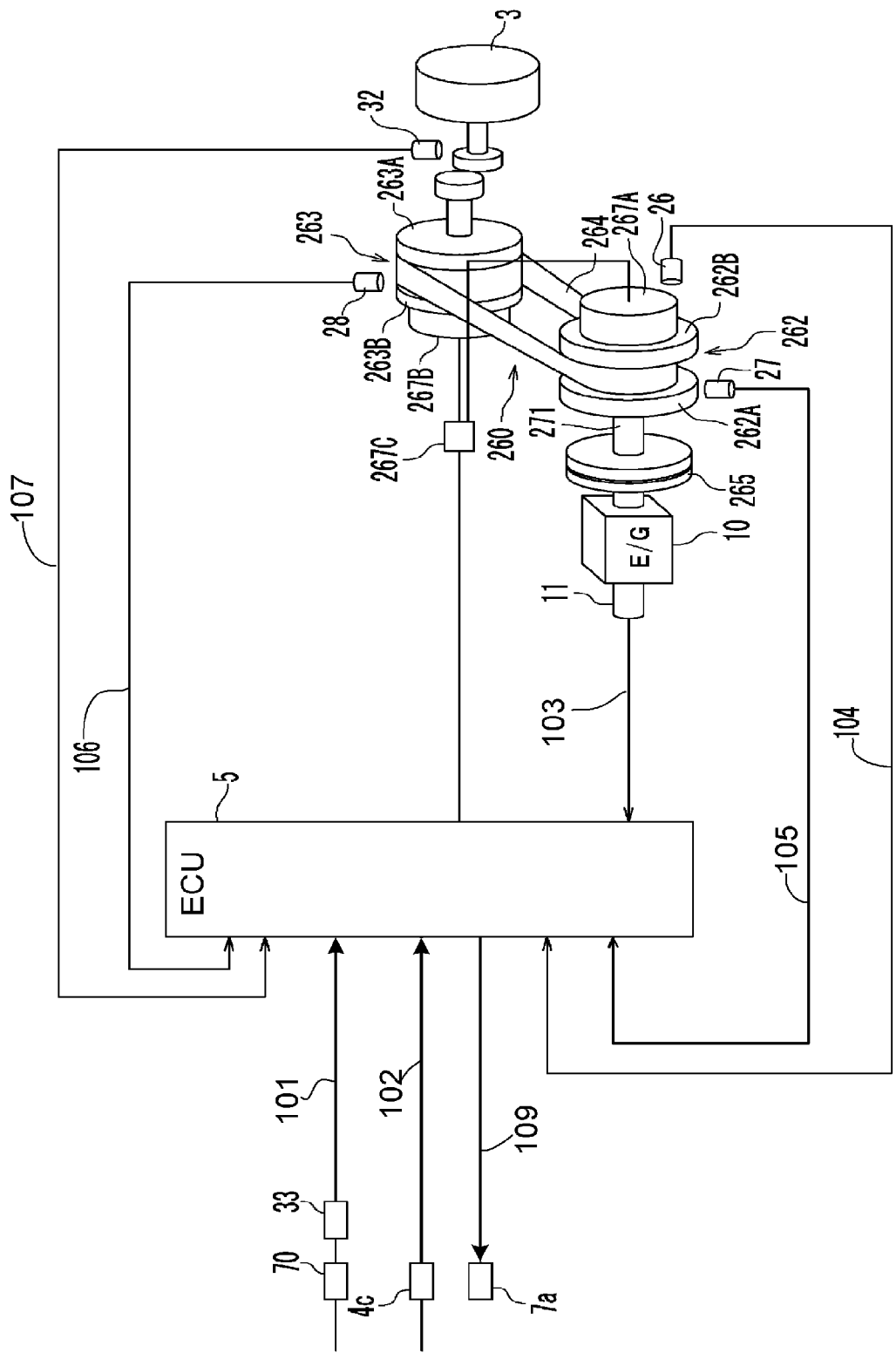
FIG. 11 is a block diagram of a continuously variable transmission and a control device according to a second embodiment of the present invention.

FIG. 11 is a block diagram showing a continuously variable transmission 260 and a control system of the motorcycle according to a second embodiment. Also in the second embodiment, the transmission 260 is a belt-type ECVT. However, the belt of a transmission 260 according to the second embodiment is the so-called metallic belt 264.

In the first embodiment, the actuator of the ECVT was the motor 22 (see FIG. 3). However, the actuator of the ECVT is not necessarily limited to the motor 22. According to the second embodiment explained hereinafter, the actuator of the ECVT is a hydraulic actuator.

Furthermore, as shown in FIG. 3, the clutch according to the first embodiment was a centrifugal clutch 30 positioned in between the output shaft 13 of the transmission 20 and the rear wheel 3. In contrast, the clutch according to the second embodiment is a multi-plate friction clutch 265 positioned between the engine 10 and the input shaft 271 of the transmission 260.

In detail, as shown in FIG. 11, the motorcycle according to the second embodiment includes the multi-plate friction clutch 265 that is electronically-controlled and the transmission 260 that is the ECVT. The transmission 260 includes a primary sheave 262, a secondary sheave 263, and the metallic belt 264 wound around the primary sheave 262 and the secondary sheave 263. The primary sheave 262 includes a fixed sheave body 262A and a movable sheave body 262B. The secondary sheave 263 includes a fixed sheave body 263A and a movable sheave body 263B.

The primary sheave 262 is provided with a primary sheave speed sensor 27. The secondary sheave 263 is provided with a secondary sheave speed sensor 28.

The motorcycle includes, as the hydraulic actuator, a hydraulic cylinder 267A, a hydraulic cylinder 267B, and a hydraulic control valve 267C connected to the hydraulic cylinder 267A and the hydraulic cylinder 267B. The hydraulic cylinder 267A adjusts the groove width of the primary sheave 262 by driving the movable sheave body 262B of the primary sheave 262. The hydraulic cylinder 267B adjusts the groove width of the secondary sheave 263 by driving the movable sheave body 263B of the secondary sheave 263. The hydraulic control valve 267C is a valve that adjusts the hydraulic pressure fed to the hydraulic cylinders 267A and 267B. The hydraulic control valve 267C performs control such that, when the hydraulic pressure in one of the hydraulic cylinders 267A and 267B increases, the hydraulic pressure in the other cylinder is reduced. The hydraulic control valve 267C is controlled by the ECU 5.

The multi-plate friction clutch 265 is positioned between the engine 10 and the input shaft 271 of the transmission 260, and, for example, continuous control is performed according to the rotation speed of the engine 10. For example, control is performed such that the multi-plate friction clutch 265 is engaged when the rotation speed of the engine 10 reaches a stipulated value, and, on the other hand, is disengaged when the rotation speed of the engine 10 does not reach the stipulated value.

The internal structure of the ECU 5 is substantially the same as in the first embodiment. Also in the second embodiment, the same control as in the first embodiment is performed. Also in the second embodiment, the same modifications as each of the modifications of the first embodiment can be applied.

Also in the second embodiment, after starting, the ECU 5 performs the sheave position control (normal control) after rotation of the belt 264 is detected. Thus, also in the second embodiment, the sheave position control is not performed while the primary sheave 262 is rotating idly without the belt 264. Therefore, it is possible to prevent impacts from occurring at the time of starting the vehicle due to the initiation of sheave position control during the idle rotation of the primary sheave 23. Thus, also in this embodiment, accurate transmission ratio control can be realized, and ECTV control problems can be prevented from occurring.

In the second embodiment also, the multi-plate friction clutch 265 that performs engage and disengage control according to the rotation speed of the engine 10 is positioned between the engine 10 and the input shaft 271 of the transmission 260. With this structure, when shift control starts before rotation of the belt 264 is detected, in other words, before the clutch 265 is engaged, there may occur non-smooth start. However, according to this embodiment, the sheave position control (normal control) is performed after detecting the rotation of the belt 264, so even with the above-described structure, smooth start can always be performed.

In this embodiment, hydraulic pressure is constantly applied to the hydraulic cylinder 267A on the primary sheave 262 side and the hydraulic cylinder 267B on the secondary sheave 263 side. In this embodiment, the phrase "start of actuator control after starting" refers to initially varying the hydraulic pressure of at least one of the hydraulic cylinder 267A and the hydraulic cylinder 267B after starting to drive the movable sheave body 262B of the primary sheave 262 and the movable sheave body 263B of the secondary sheave 263. Therefore, just applying constant hydraulic pressure to the hydraulic cylinder 267A and the hydraulic cylinder 267B is not included in the definition of the start of actuator control as referred to here.

In each of the above-described embodiments, the scooter motorcycle 1 is explained as one example of an embodiment of the invention. However, the vehicle of the invention is not limited to the above-described scooter motorcycle 1. The vehicle of the invention can be a vehicle other than the scooter motorcycle 1, such as, e.g., a straddle-type vehicle or a side by side-type vehicle.

DEFINITIONS OF TERMS

"Drive source" refers to an object that generates force. The "drive source", for example, can be an internal combustion engine or an electric motor.

"Electronically-controlled transmission" refers to a general transmission that uses electricity to shift the transmission ratio. The "Electronically-controlled transmission" includes transmissions in which the transmission ratio is shifted by an electric motor and transmissions in which the transmission ratio is shifted by an electronically-controlled hydraulic actuator. In other words, as long as it is electrically controlled, there is no specific limitation on the type of actuator that varies the transmission ratio.

INDUSTRIAL APPLICABILITY

The present invention is useful for an electronically-controlled continuously variable transmission control device, a continuously variable transmission, and a vehicle equipped with the same.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A control device for an electronically-controlled continuously variable transmission positioned between a drive source and a driving wheel of a vehicle and capable of continuously varying a transmission ratio, wherein the continuously variable transmission comprises:
an input shaft;
an output shaft;
a primary sheave that includes a primary fixed sheave body capable of rotating together with the input shaft and a primary movable sheave body capable of rotating together with the input shaft and facing the primary fixed sheave body in an axially movable manner with respect to the input shaft, the primary movable sheave body and the primary fixed sheave body forming a primary-side belt groove that extends and widens toward a radially outward direction thereof;
a secondary sheave that includes a secondary fixed sheave body capable of rotating together with the output shaft and a secondary movable sheave body capable of rotating together with the output shaft and facing the secondary fixed sheave body in an axially movable manner with respect to the output shaft, the secondary movable sheave body and the secondary fixed sheave body forming a secondary-side belt groove that extends and widens toward a radially outward direction thereof;

a belt wound in the primary-side belt groove and the secondary-side belt groove;
an actuator that varies a transmission ratio between the primary sheave and the secondary sheave by varying at least one of a width of the primary-side belt groove and a width of the secondary-side belt groove;
a belt rotation detection sensor that detects rotation of the belt directly or indirectly; and
a control portion that controls the actuator,
wherein, after starting the drive source, the control portion starts control of the actuator only after rotation of the belt is detected.

2. The control device for the electronically-controlled continuously variable transmission as cited in claim 1, wherein the belt rotation detection sensor detects the rotation of the belt by detecting a rotation speed of the secondary sheave.

3. The control device for the electronically-controlled continuously variable transmission as cited in claim 2, wherein the belt rotation detection sensor outputs a sheave rotation speed signal corresponding to the detected rotation of the belt to the control portion.

4. The control device for the electronically-controlled continuously variable transmission as cited in claim 1, wherein the belt rotation detection sensor detects the rotation of the belt by detecting a traveling speed of the belt optically or magnetically.

5. The control device for the electronically-controlled continuously variable transmission as recited in claim 1, wherein the continuously variable transmission further comprises a centrifugal clutch positioned between the output shaft and the driving wheel.

6. The control device for the electronically-controlled continuously variable transmission as recited in claim 1, wherein the continuously variable transmission further comprises a clutch positioned between the drive source and the input shaft.

7. The control device for the electronically-controlled continuously variable transmission as recited in claim 6, wherein the clutch is a multi-plate friction clutch.

8. The control device of the continuously variable transmission as recited in claim 1, wherein the belt comprises a rubber belt.

9. The control device for the electronically-controlled continuously variable transmission as recited in claim 1,
wherein the control portion includes an error warning light for notification concerning errors, and
wherein the control portion determines whether the belt is rotating based on a detection result from the belt rotation detection sensor and, when the control portion determines that the belt is rotating, the control portion performs normal control of the transmission ratio, or when the control portion determines that the belt is not rotating, the control portion repeatedly performs determination for a stipulated period of time or up to a stipulated number of times concerning whether the belt is rotating, and when determination that the belt has not rotated reaches the stipulated period of time or when determination that the belt has not rotated is performed for exactly the stipulated number of times, the control portion activates the error warning light.

10. The control device for the electronically-controlled continuously variable transmission as recited in claim 1, further comprising a memory portion that stores a pre-set transmission ratio,
wherein the control portion, by controlling the actuator, performs normal control of the transmission ratio for controlling the transmission ratio of the continuously variable transmission toward the pre-set transmission ratio, and
wherein, after the belt rotation detection sensor detects rotation of the belt after starting the drive source, the control portion starts the normal control of the transmission ratio after the actuator has been once controlled to shift the transmission ratio to a LOW side.

11. The control device for the electronically-controlled continuously variable transmission as recited in claim 1,
wherein the belt rotation detection sensor includes
a primary-side rotation speed sensor that detects a rotation speed of the primary sheave, and
a secondary-side rotation speed sensor that detects a rotation speed of the secondary sheave, and
wherein the control portion detects the rotation of the belt based on the rotation speed of the primary sheave and the rotation speed of the secondary sheave.

12. The control device for the electronically-controlled continuously variable transmission as recited in claim 11,
wherein the primary-side rotation speed sensor outputs a primary sheave rotation speed signal corresponding to the detected rotation of the primary sheave to the control portion, and
wherein the secondary-side rotation speed sensor outputs a secondary sheave rotation speed signal corresponding to the detected rotation of the secondary sheave to the control portion.

13. The control device for the electronically-controlled continuously variable transmission as recited in claim 11, wherein the control portion calculates an actual transmission ratio from the rotation speed of the primary sheave detected by the primary-side rotation speed sensor and the rotation speed of the secondary sheave detected by the secondary-side rotation speed sensor, and detects rotation of the belt by comparing a pre-set transmission ratio set with the actual transmission ratio.

14. An electronically-controlled continuously variable transmission positioned between a drive source and a driving wheel of a vehicle and capable of continuously varying a transmission ratio, the continuously variable transmission comprising:
an input shaft;
an output shaft;
a primary sheave that includes a primary fixed sheave body capable of rotating together with the input shaft and a primary movable sheave body capable of rotating together with the input shaft and facing the primary fixed sheave body in an axially movable manner with respect to the primary fixed sheave body, the primary movable sheave body and the primary fixed sheave body forming a primary-side belt groove that extends and widens toward a radially outward direction thereof;
a secondary sheave that includes a secondary fixed sheave body capable of rotating together with the output shaft and a secondary movable sheave body capable of rotating together with the output shaft and facing the secondary fixed sheave body in an axially movable manner with respect to the secondary fixed sheave body, the secondary movable sheave body and the secondary fixed sheave body forming a secondary-side belt groove that extends and widens toward the radially outward direction thereof;
a belt wound in the primary-side belt groove and the secondary-side belt groove;
an actuator that varies a transmission ratio between the primary sheave and secondary sheave by varying at least one of a width of the primary-side belt groove and a width of the secondary-side belt groove;

a belt rotation detection sensor that detects rotation of the belt directly or indirectly; and a control portion that controls the actuator, wherein, after starting the drive source, the control portion starts control of the actuator only after rotation of the belt is detected.

15. A vehicle comprising:

a control device for an electronically-controlled continuously variable transmission positioned between a drive source and a driving wheel of a vehicle and capable of continuously varying a transmission ratio, wherein the continuously variable transmission comprises:

an input shaft;

an output shaft;

a primary sheave that includes a primary fixed sheave body capable of rotating together with the input shaft and a primary movable sheave body capable of rotating together with the input shaft and facing the primary fixed sheave body in an axially movable manner with respect to the input shaft, the primary movable sheave body and the primary fixed sheave body forming a primary-side belt groove that extends and widens toward a radially outward direction thereof;

a secondary sheave that includes a secondary fixed sheave body capable of rotating together with the output shaft and a secondary movable sheave body capable of rotating together with the output shaft and facing the secondary fixed sheave body in an axially movable manner with respect to the output shaft, the secondary movable sheave body and the secondary fixed sheave body forming a secondary-side belt groove that extends and widens toward a radially outward direction thereof;

a belt wound in the primary-side belt groove and the secondary-side belt groove;

an actuator that varies a transmission ratio between the primary sheave and the secondary sheave by varying at least one of a width of the primary-side belt groove and a width of the secondary-side belt groove;

a belt rotation detection sensor that detects rotation of the belt directly or indirectly; and a control portion that controls the actuator, wherein, after starting the drive source, the control portion starts control of the actuator only after rotation of the belt is detected.

16. A vehicle comprising:

an electronically-controlled continuously variable transmission positioned between a drive source and a driving wheel of a vehicle and capable of continuously varying a transmission ratio, the continuously variable transmission comprising:

an input shaft;

an output shaft;

a primary sheave that includes a primary fixed sheave body capable of rotating together with the input shaft and a primary movable sheave body capable of rotating together with the input shaft and facing the primary fixed sheave body in an axially movable manner with respect to the primary fixed sheave body, the primary movable sheave body and the primary fixed sheave body forming a primary-side belt groove that extends and widens toward a radially outward direction thereof;

a secondary sheave that includes a secondary fixed sheave body capable of rotating together with the output shaft and a secondary movable sheave body capable of rotating together with the output shaft and facing the secondary fixed sheave body in an axially movable manner with respect to the secondary fixed sheave body, the secondary movable sheave body and the secondary fixed sheave body forming a secondary-side belt groove that extends and widens toward the radially outward direction thereof;

a belt wound in the primary-side belt groove and the secondary-side belt groove;

an actuator that varies a transmission ratio between the primary sheave and secondary sheave by varying at least one of a width of the primary-side belt groove and a width of the secondary-side belt groove;

a belt rotation detection sensor that detects rotation of the belt directly or indirectly; and a control portion that controls the actuator, wherein, after starting the drive source, the control portion starts control of the actuator only after rotation of the belt is detected.

* * * * *